United States Patent [19]

Jefferson

[11] Patent Number: 5,104,188

[45] Date of Patent: Apr. 14, 1992

[54] BICYCLE SEAT FOR CHILDREN

[76] Inventor: Malcolm Jefferson, Apt. 1, 176 Florence Street, Ottawa, Ontario, Canada, K1R 4N5

[21] Appl. No.: 585,286

[22] Filed: Sep. 17, 1990

Related U.S. Application Data

[63] Continuation of Ser. No. 248,964, Sep. 26, 1988, abandoned.

[51] Int. Cl.$^5$ .............................. B62J 1/28
[52] U.S. Cl. .................. 297/195; 297/243; 297/423; 280/202
[58] Field of Search ............ 297/195, 243, 423; 280/202

[56] References Cited

U.S. PATENT DOCUMENTS

| 579,514 | 3/1897 | Collins | 297/243 |
|---|---|---|---|
| 645,668 | 3/1900 | Lemoon | 280/202 |
| 2,234,299 | 3/1941 | Christy | 280/202 |
| 2,944,590 | 7/1960 | Cooper | 280/202 |
| 3,743,321 | 7/1973 | Luschen et al. | 280/202 |
| 3,802,598 | 4/1974 | Burger et al. | 297/243 |
| 4,051,985 | 10/1977 | Berger | 297/243 |
| 4,053,091 | 10/1977 | Martelet | 297/243 X |
| 4,305,532 | 12/1981 | Reminger | 297/243 |
| 4,650,249 | 3/1987 | Serber | 297/195 |
| 4,919,477 | 4/1990 | Loewke et al. | 280/202 X |

FOREIGN PATENT DOCUMENTS

| 910389 | 11/1956 | Fed. Rep. of Germany | 297/243 |
|---|---|---|---|
| 165209 | 6/1921 | United Kingdom | 280/202 |

*Primary Examiner*—Peter R. Brown
*Attorney, Agent, or Firm*—Bauer & Schaffer

[57] ABSTRACT

A bicycle seat for a child, adapted for removable engagement with a horizontal cross bar on an adult bicycle is provided. A unitary seat includes a seat portion which may be provided with a backrest, and a lap belt, and there are downwardly depending compartments in front of the seat having adjustable bottom plates to provide foot support for a child carried in the seat. A handle bar is provided in front of the child, as is a removable headrest. Locking means are provided below the seat for releasable engagement with a bicycle cross bar, between the adult seat and the handle bars thereof. The child is thus able to enjoy a secure ride in close communication with the adult bicycle rider.

4 Claims, 11 Drawing Sheets

FIG. I

BICYCLE SEAT FOR CHILDREN

This is a continuation of Ser. No. 248,964 filed 9/26/88, now abandoned.

Several types of seats to carry children on a bicycle driven by an adult have been made available in the past. Of these, the most common is a seat adapted to be connected to the rear fender of the bicycle, with the child straddling the rear wheel.

Prior art seat structures have several disadvantages. With the child positioned behind the adult bicycle rider, the rider cannot be certain that the child is secure and comfortable. In order to check the child it is necessary to stop the bicycle, so that the rider may turn around to inspect or adjust the child. Further, the child is positioned close to the rear wheel, with the resultant danger of the hands or feet of the child being injured by the bicycle wheel or the spokes of the wheel.

A further disadvantage of prior art child seats for bicycles is the relative difficulty of installation. Most bicycle seats require loosening or removal of the rear wheel retaining nuts, in order to receive supporting bars extending downwardly from the seat, with the result that the alignment of the rear wheel must be re-adjusted as the seat is being installed. Additional connection means are also necessary in order to provide stability for prior art child seats, thus involving a substantial effort and amount of care on the part of the person installing the seat.

One of the objects of the present invention is to eliminate the above disadvantages.

A principal object of the subject invention is to provide a child seat for engagement with the cross bar of the bicycle, between the adult seat and the handle bars of the bicycle.

A further object of the invention is to provide a child seat that may be quickly and easily attached to and removed from the cross bar of a bicycle.

A still further object of the invention is to provide a child seat for attachment to bicycles which may be adjusted to accommodate children of different sizes.

A further object of the invention is to provide a child seat for attachment to bicycles which includes an adaptor for use on a woman's bicycle having no unitary cross bar.

A still further objection of the invention is to provide a seat adapted to be attached to an adult bicycle, and including a headrest for the child being transported.

A further object of the invention is to provide a child carrier whereby the child will ride in front of the adult driving the bicycle, and thus be in a position for conversation, and provide a sense of security for the child, being between the arms of the adult, while being fully supported by the child carrier attached to the bicycle, and at the same time provide the bicycle driver with easy awareness of the condition of the child.

A principal object of the invention is to provide a bicycle seat for a child adapted for removable engagement with the cross bar of the bicycle comprising: a unitary body having a seat and downwardly depending compartments in front of said seat. adapted to receive the feet and lower legs of a child occupying said seat; and locking means below said seat for releasable engagement with a bicycle cross bar.

These and other objects of the invention will become apparent with reference to the following description.

A detailed description of the invention will now be made, with reference the accompanying drawings in which.

Detailed reference will now be made to the drawings, in which like reference numerals will identify like parts.

Figure 1:
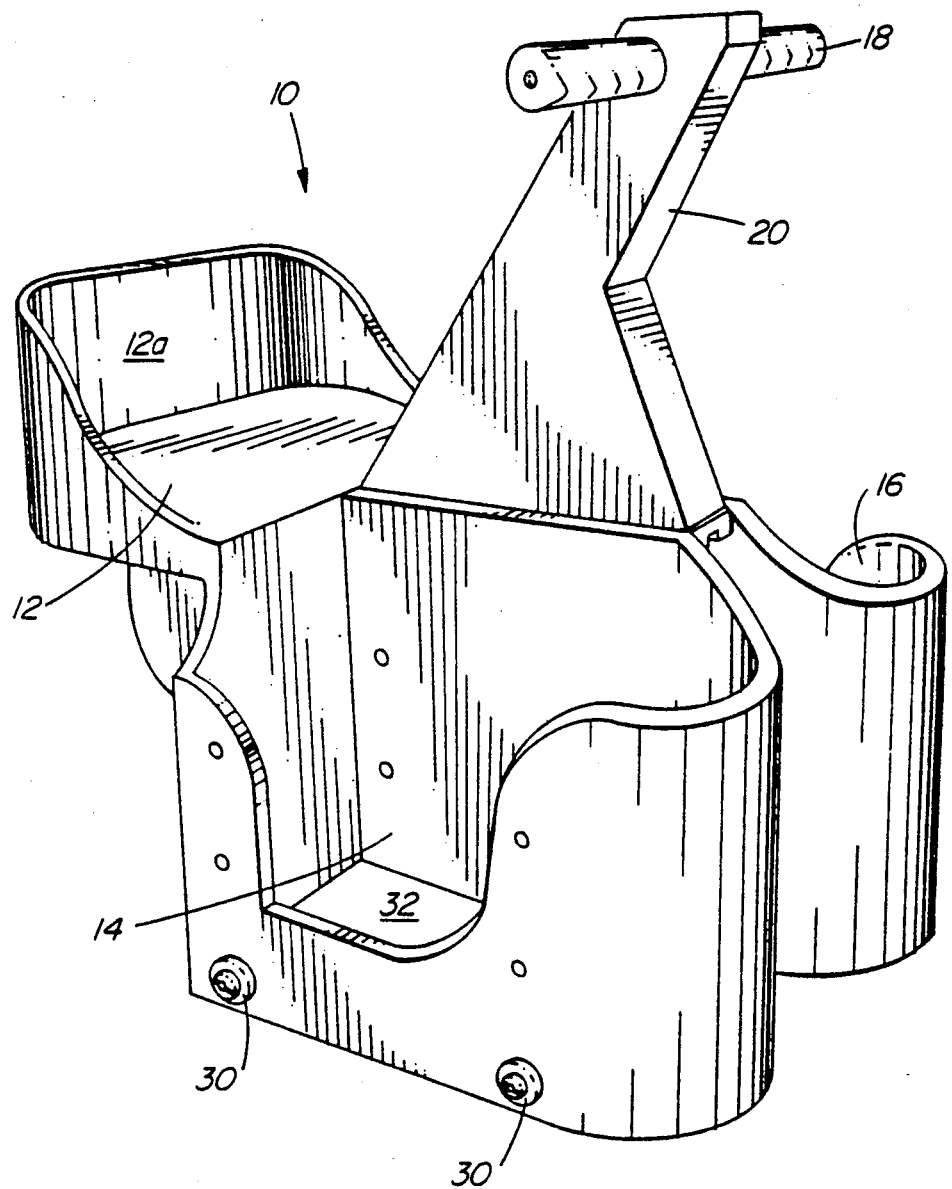
FIG. 1 is an isometric view of one embodiment of a child seat for attachment to an adult bicycle.
Figure 2:
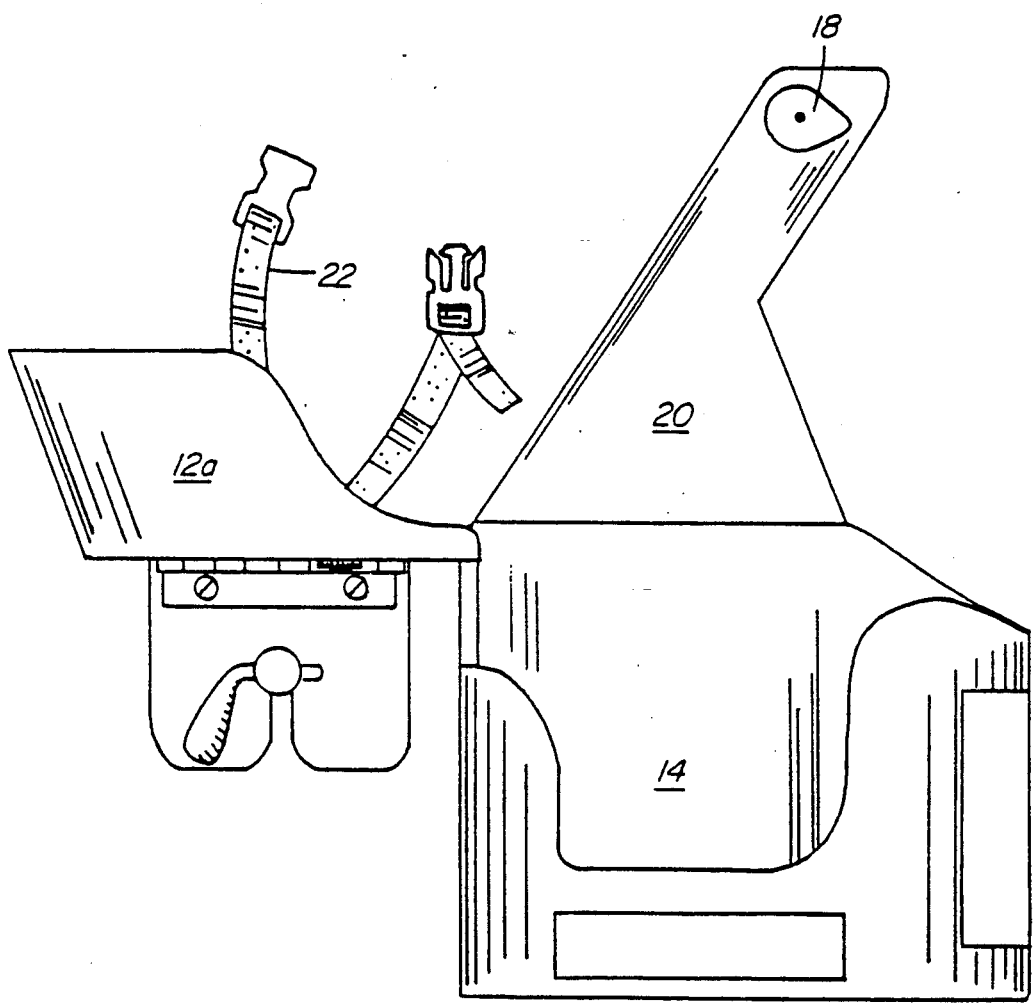
FIG. 2 is a side elevation thereof.
Figure 3:
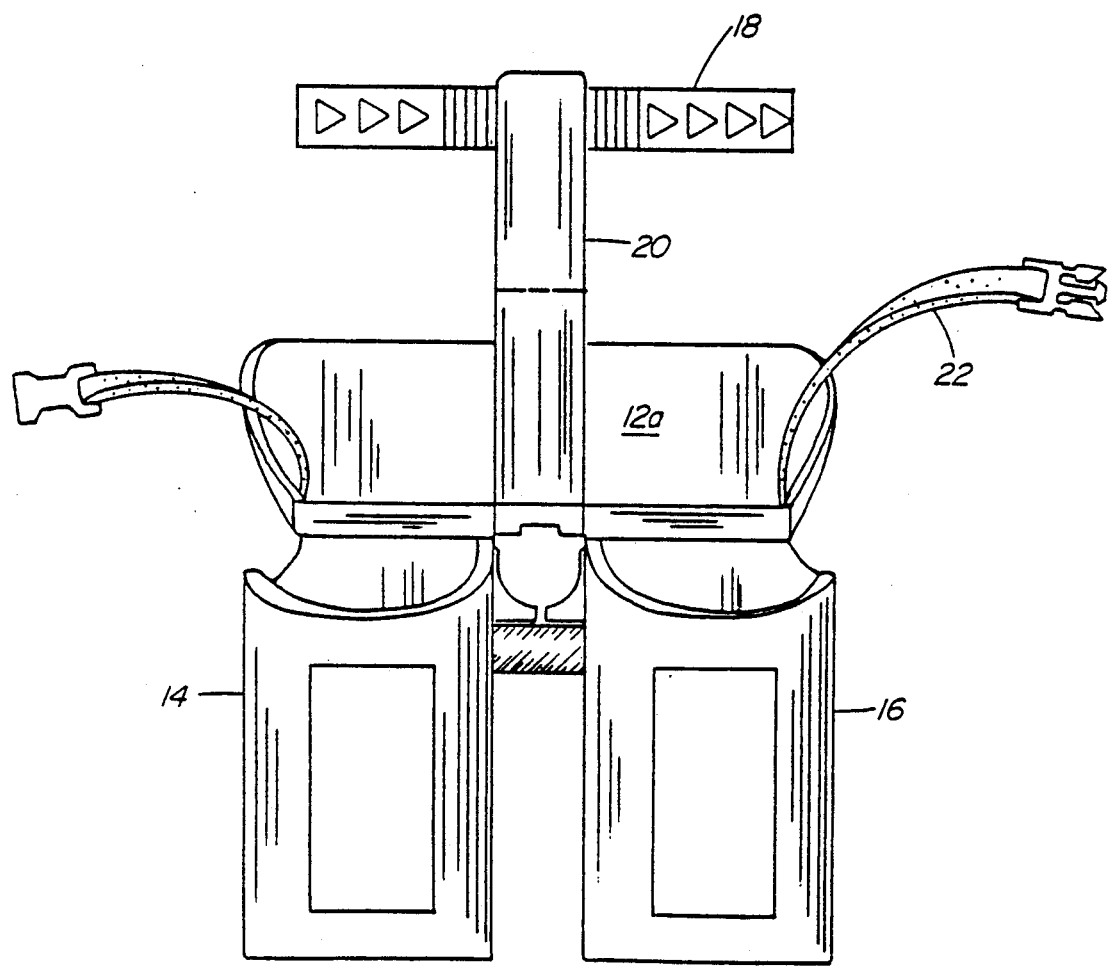
FIG. 3 is a front elevation.

Referring to FIG. 1 a child seat adapted for engagement with a bicycle comprises a unitary body indicated generally at 10. Body 10 includes a seat portion 12 at the rear thereof, and a pair of downwardly projecting compartments 14 and 16 in front of seat portion 12 adapted to receive a child's legs and feet. A central handle bar 18 is supported in front of and above seat 10 on a pedestal 20 projecting centrally above leg compartments 14 and 16. Handle bar 18 conveniently positioned in front of a child seated on the carrier provides additional security and a sense of balance for the child being carried.

Referring now to FIGS. 2 through 6, it will be seen that a lap belt 22 (not illustrated in FIG. 1) is affixed at each side of seat 12, so that a child being carried may be securely retained in seat 12. Seat 12 is also provided with a back support 12a.

Figure 4:
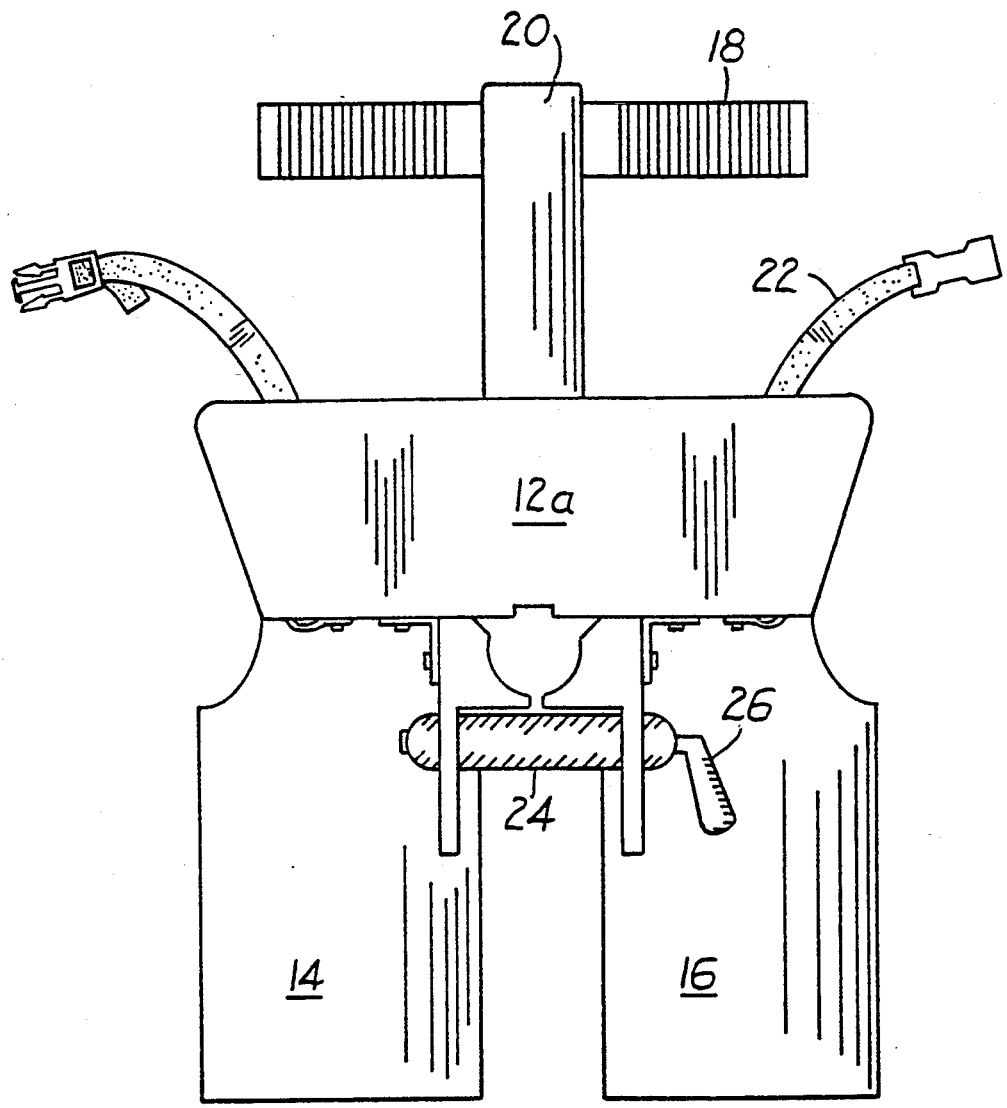
FIG. 4 is a rear elevation.
Figure 5:
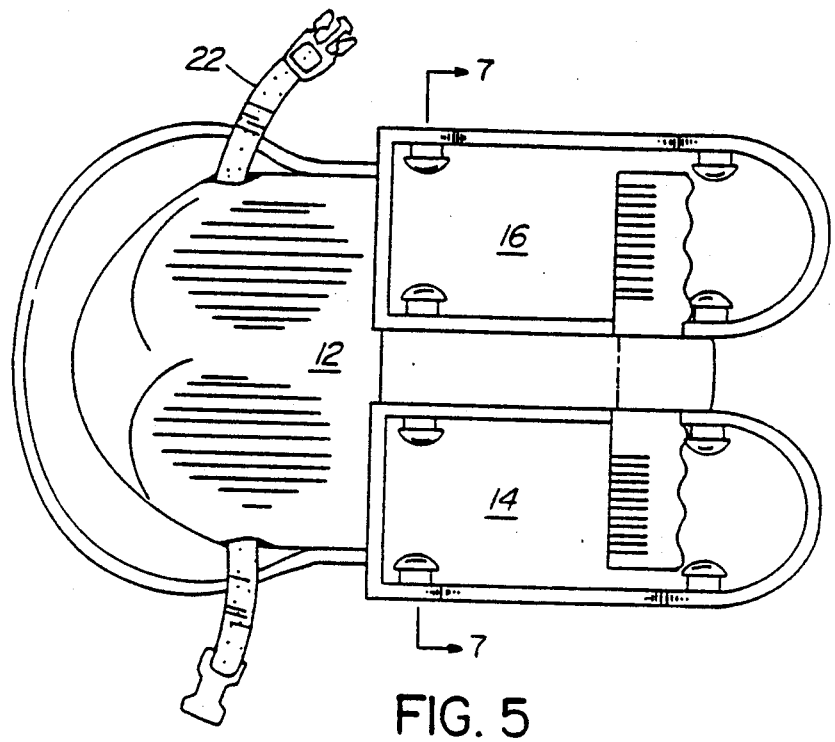
FIG. 5 is a top plan.
Figure 6:
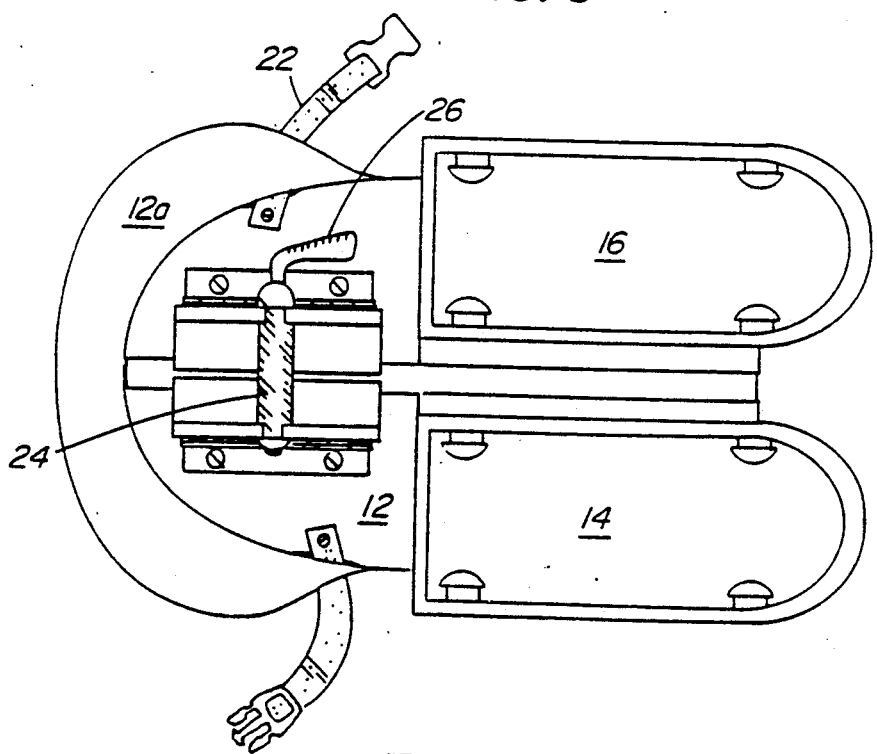
FIG. 6 is a bottom plan.
Figure 11:
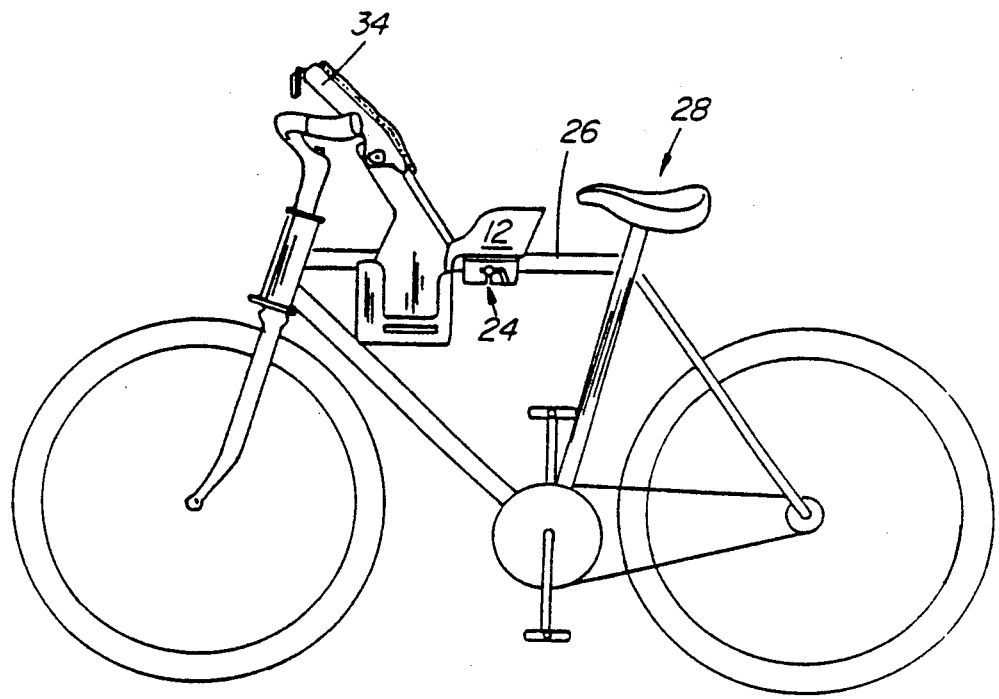
FIG. 11 is a side elevation of a bicycle having a cross bar with a child carrier according to the invention affixed thereto.
Figure 12:
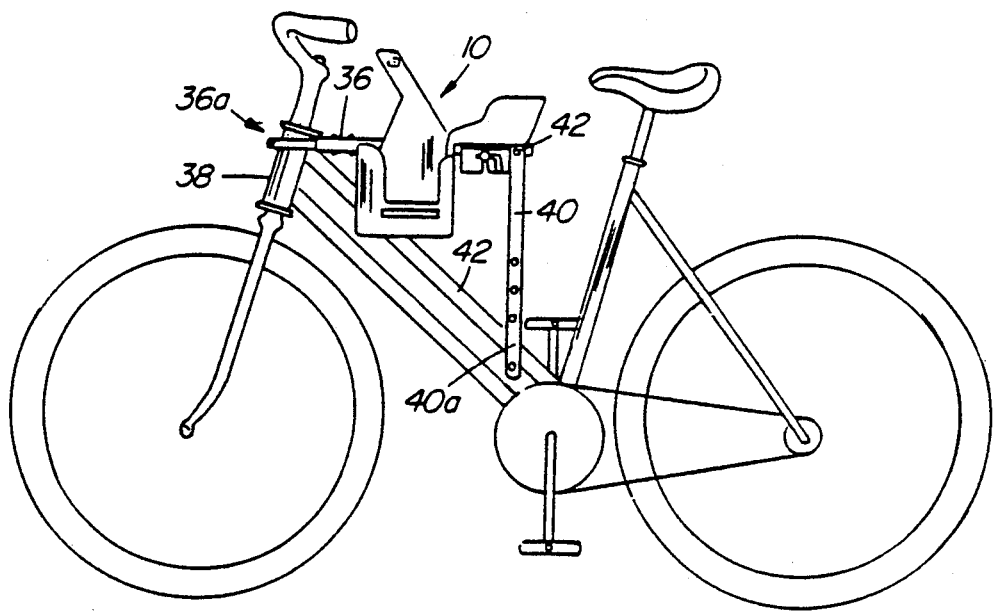
FIG. 12 is a side elevation of a bicycle having non unitary cross bar, with a child carrier according to the invention affixed thereto by means of an adaptor bar.
Figure 13:
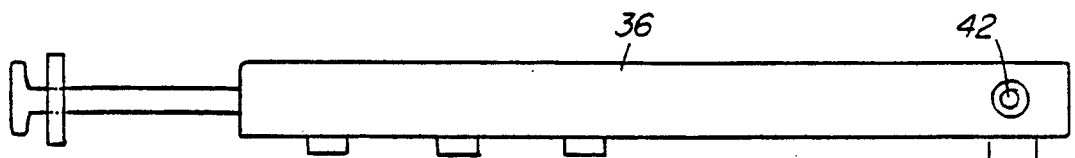
FIG. 13 is a side elevation of an adaptor bar for use on a woman's bicycle.
Figure 14:
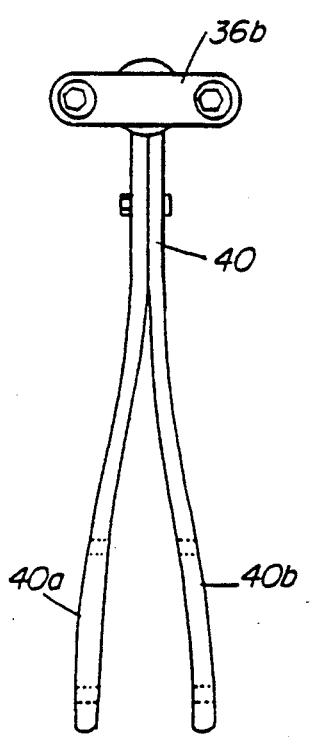
FIG. 14 is a front elevation of the adaptor of FIG. 13.
Figure 15:
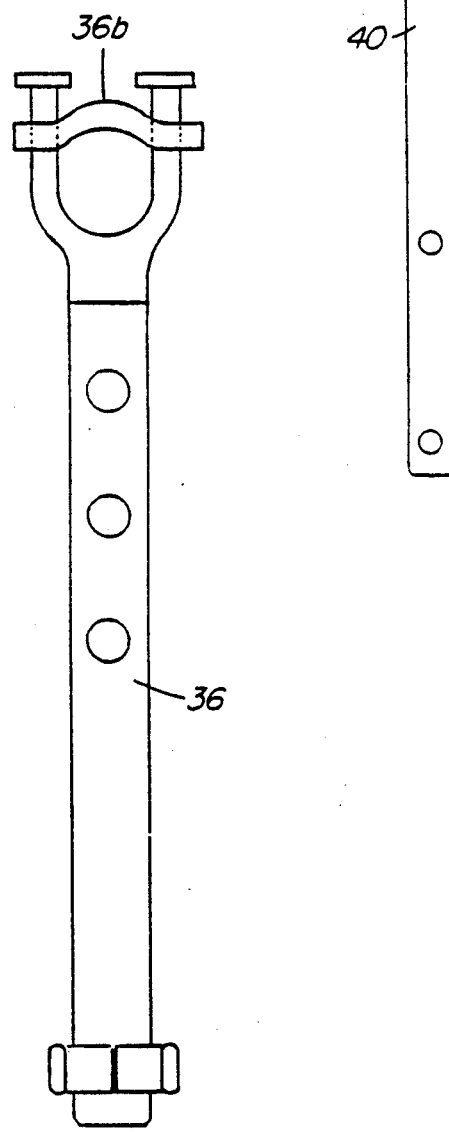
FIG. 15 is a top plan of the bar of FIG. 13.

Referring now to FIGS. 4, 6 and 11, an eccentric tightener 24 is shown below seat 12a, having a handle 26 at one side thereof adapted to removably affix the seat to a bicycle cross bar. Eccentric tightener 24 is commercially available under several trade marks and are commonly referred to as "quick-release clamps". Alternatively, any locking device, such as a circular clamp as used on automobile cooling systems, and which are easily tightened and loosened by means of a screw driver.

Referring to FIG. 11 it will be seen that eccentric tightener 24 is adapted to engage the underside of a cross bar 26 of a bicycle 28, and thus to hold the child carrier securely thereon.

Figure 7:
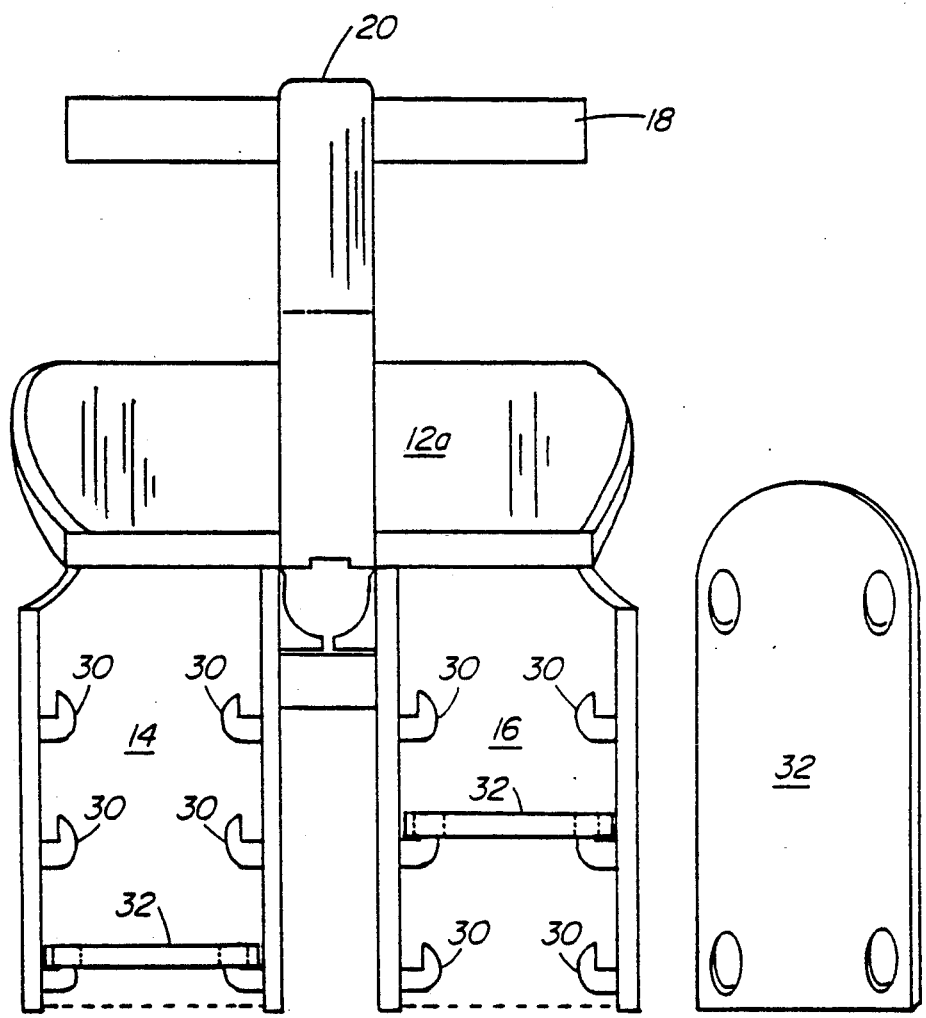
FIG. 7 is a sectional view taken along lines 7—7 of FIG. 5.

With reference to FIG. 7, and with reference to FIG. 1 of the drawings, it will be seen that leg compartments 14 and 16 are provided with floor plates 32. Floor plates 32 are supported by inwardly projecting L-shaped support members 30, which may be moved from the lower position illustrated in FIG. 1, to a plurality of higher positions (see FIG. 7), whereby plates 32 may be positioned within compartments 14 and 16 to provide support for the feet of the child being carried, according to the length of the child's legs. Support members 30, as seen in FIG. 4 may be adjusted through use of simple threaded fasteners, or the like.

Figure 8:
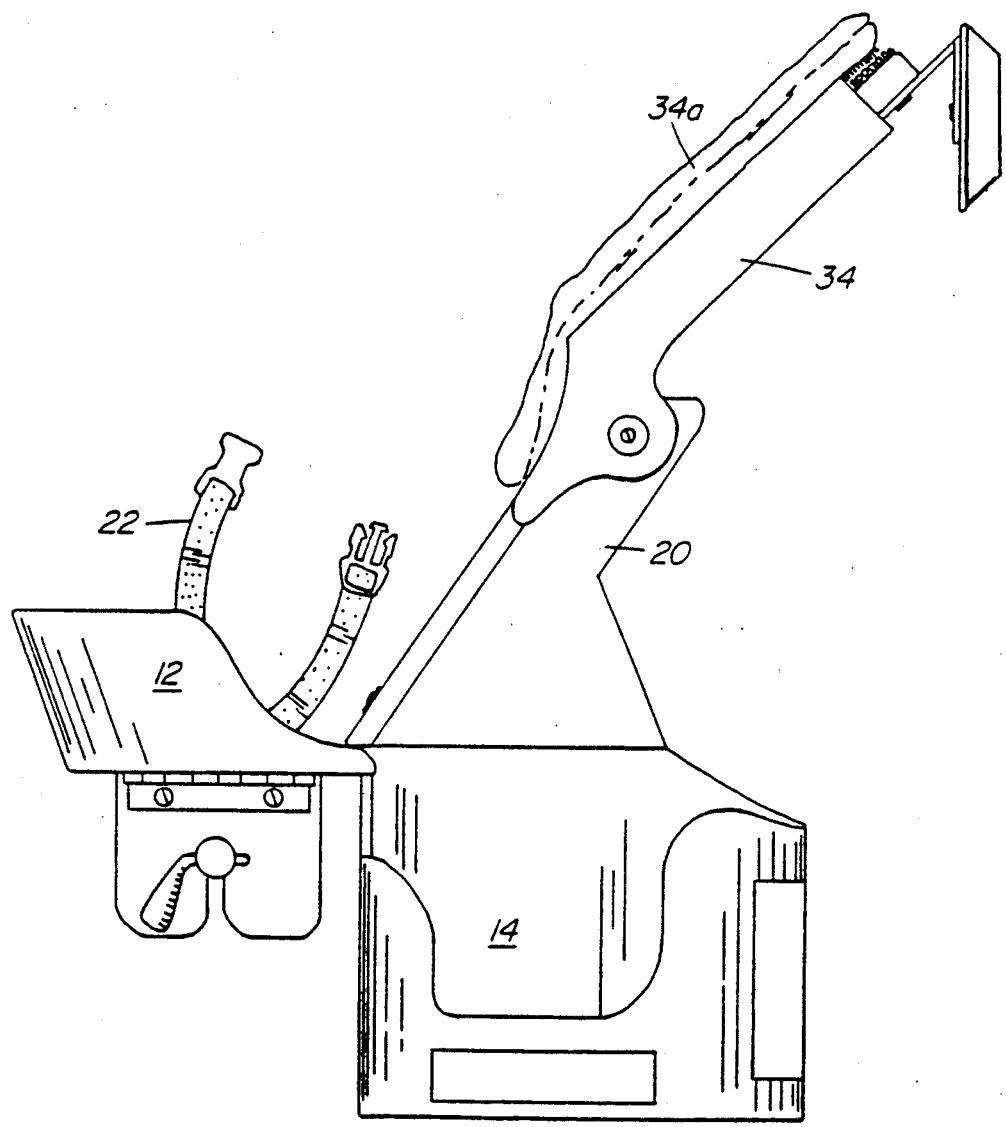
FIG. 8 is a side elevation of an embodiment of the seat according to the invention including a headrest.
Figure 9:
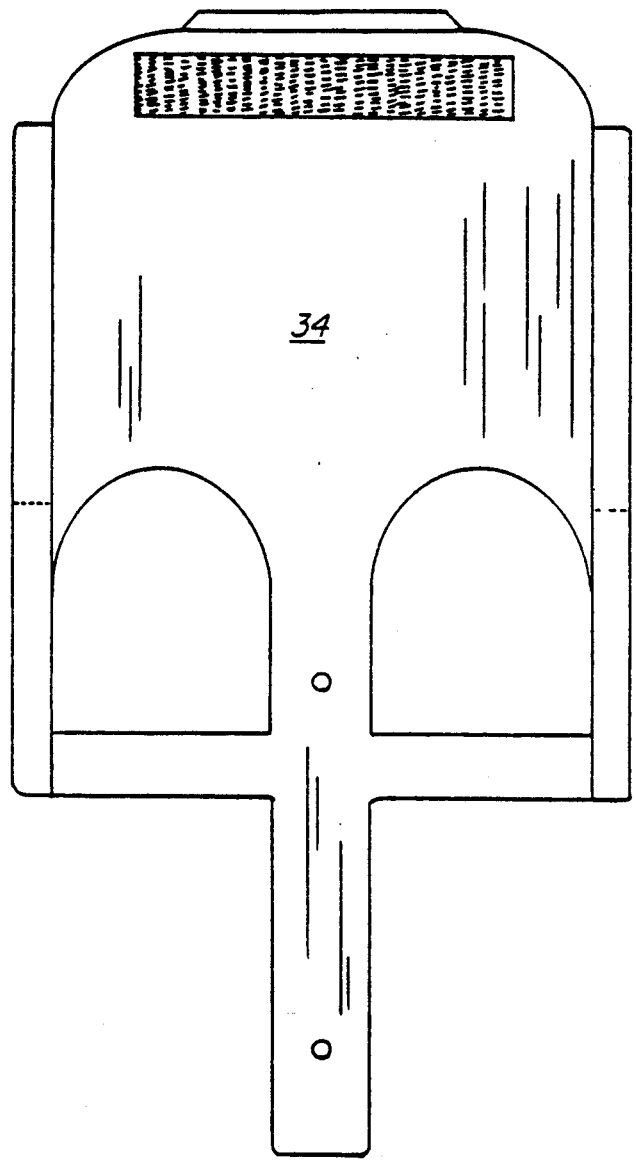
FIG. 9 is a front elevation of the headrest.
Figure 10:
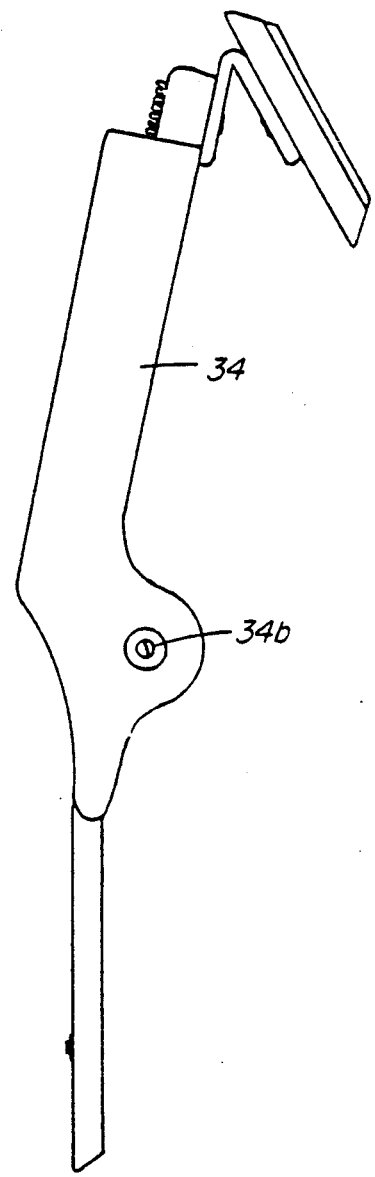
FIG. 10 is a side elevation of the headrest.

Referring now to FIGS. 8, 9 and 10, a head rest 34 is adapted for removable connection to handle bar pedestal 20, whereby a child riding in carrier 10 may rest his head thereon. It has been found that a child enjoying a ride in a bicycle seat according to the invention will sometimes tend to become sleepy, as a result of the fresh air and motion of the bicycle. The provision of headrest 34 makes it possible for a child to be comfortable while asleep in the bicycle seat. Headrest 34 may be provided with a suitable cushion 34a, and may be affixed to pedestal 20, by any suitable means, such as bolt 34b.

Referring now to FIGS. 12 through 15, a bar 36 is adapted to be removably engaged with a woman's bicycle of the type having no horizontal cross bar, so as to provide a support for the child bicycle seat according to the invention. It will be seen that bar 36 may be clamped at 36a to the steering post 38 of a bicycle, as by means of adjustable clamp 36b. A vertical post 40 is hingedly connected at 42 to horizontal bar 36, and includes a forked pair of arms 40a and 40b adapted to be bolted to the diagonal bracing bar 42 illustrated in the views of FIG. 12 and 16.

Figure 16:
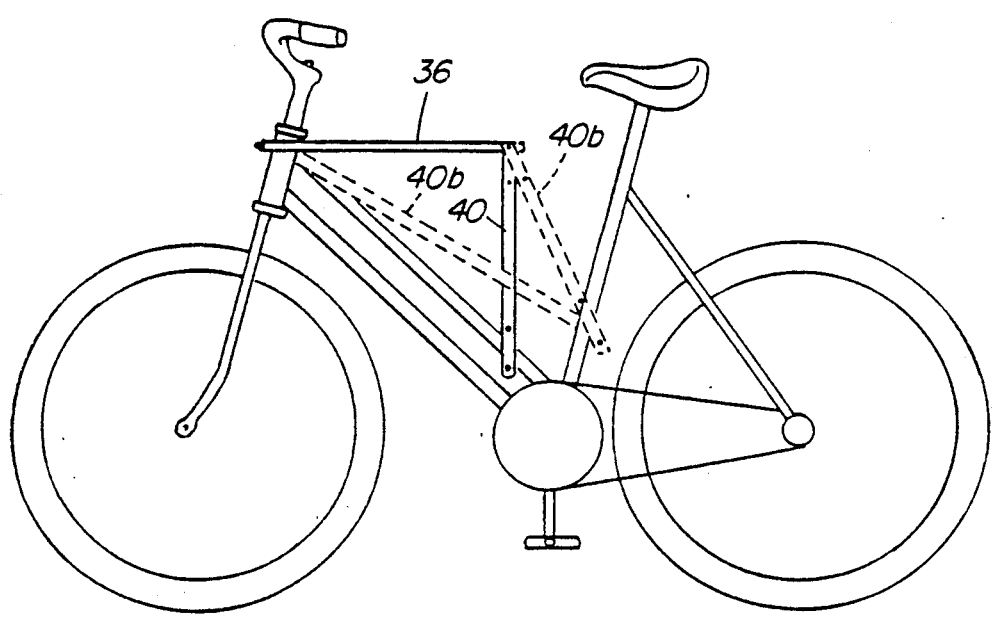
FIG. 16 is a side elevation of a woman's bicycle having an adaptor bar affixed thereto, with an alternative support shown in broken lines.

As seen in FIG. 16, an alternative method of attachment of bars 36 with support bars 40b being affixed to the bicycle in an alternative clamping arrangement.

The bicycle seat for children described above thus provides safe, secure seating for a child on a bicycle being driven by an adult, and permits the child and the adult to communicate easily during travel. The quick connect-disconnect mechanism provided for the bicycle seat, whether it is to be attached to a bicycle having a horizontal cross bar, or a bicycle requiring a cross bar adaptor, makes it simple, and inexpensive for the user of this bicycle seat.

The foregoing is by way of example only and the invention should be limited only by the scope of the appended claims.

The embodiments of the invention in which an exclusive property or privilege is claimed are defined as follows:

1. A child's seat for a bicycle having a cross-bar extending between the handle bar and the bicycle seat comprising a unitary elongated body having a seat at the rear of said body and a pair of compartments spaced laterally from each other in front of said seat, said compartments comprising a box being closed at the bottom and at the front and open at the top and the rear to receive therein the feet and lower legs of a child occupying said seat, said body having an elongated groove on its undersurface conforming to said cross-bar and means for mounting said body on the bicycle cross-bar so that the compartments hang symmetrically on either side of the bicycle cross-bar to the rear of the bicycle handle and in front of the bicycle seat and having means for releasably fastening said body to said cross-bar, a pedestal projecting upwardly from said body in front of said seat, a panel mounted on said pedestal extending upwardly and forwardly therefrom to support the head and shoulders of the child occupying the seat.

2. A bicycle seat according to claim 1, said seat having an upwardly projecting back rest.

3. The seat according to claim 1 wherein said panel is provided with cushioning means.

4. A child's seat for a bicycle having a cross-bar extending between the handle bar and the bicycle seat comprising a unitary elongated body having a seat at the rear of said body and a pair of compartments spaced laterally from each other in front of said seat, said compartments comprising a box being closed at the bottom and t the front and open at the top and the rear to receive therein the feet and lower legs of a child occupying said seat, said body having an elongated groove on its undersurface conforming to said cross-bar and means for mounting said body on the bicycle cross-bar so that the compartments hang symmetrically on either side of the bicycle cross-bar to the rear of the bicycle handle and in front of the bicycle seat and having means for releasably fastening said body to said cross-bar, a pedestal projecting upwardly from said body in front of said seat, a panel mounted on said pedestal extending upwardly and forwardly therefrom to support the head and shoulders of the child occupying the seat wherein the compartment is provided with a foot support and means for adjusting the position of said foot support at spaced intervals between the closed bottom and open top.

* * * * *

UNITED STATES PATENT AND TRADEMARK OFFICE
CERTIFICATE OF CORRECTION

PATENT NO. : 5,104,188
DATED : April 14, 1992
INVENTOR(S) : MALCOM JEFFERSON

It is certified that error appears in the above-identified patent and that said Letters Patent is hereby corrected as shown below:

Column 4,

CLAIM 1, LAST LINE, AFTER "SEAT" INSERT --, WHEREIN SAID PANEL IS PIVOTALLY HINGED TO SAID PEDESTAL TO PERMIT THE ANGLE OF SAID PANEL TO SAID PEDESTAL TO BE ADJUSTED.--

Col. 4, claim 4, line 7 "t" should be --at--

Signed and Sealed this

Thirteenth Day of July, 1993

Attest:

MICHAEL K. KIRK

Attesting Officer

Acting Commissioner of Patents and Trademarks